United States Patent Office 3,850,867
Patented Nov. 26, 1974

3,850,867
NON-STICK COATING COMPOSITIONS OF FLUOROCARBON RESIN PARTICLES AND AQUEOUS SLIP OF SINTERED GLAZE PARTICLES
Louis Hartmann, Rumilly, France, assignor to
S. A. Tefal, Rumilly, France
No Drawing. Filed Mar. 20, 1973, Ser. No. 343,146
Int. Cl. C08f 45/24
U.S. Cl. 260—29.6 F 8 Claims

ABSTRACT OF THE DISCLOSURE

This invention relates to a non-stick coating composition containing a fluorocarbon resin, more particularly for coating metal surfaces, such as aluminium discs. This composition comprises an aqueous dispersion of fluorocarbon resin particles and a non-ionic wetting agent and is characterized in that it contains also an aqueous slip comprising sintered glaze particles dispersed in water, said particles having a melting point above 400° C.

---

This invention relates to a non-stick coating composition containing a fluorocarbon resin, more particularly for coating metal surfaces, such as aluminium discs.

The invention also relates to the process for the production of such a non-stick coating, and it also relates, under the heading of a novel industrial product, to the resulting manufactured article.

Fluorocarbon polymer based coatings as non-stick coatings in kitchen utensils have developed rapidly since 1956. At the present time they are in widespread use since the process described in French Pat. No. 1,120,749 provided a reliable fixing of such coatings on various metals, inter alia aluminium and its alloys.

In this process, the metal surface is subjected to chemical attack, to produce a percus keying layer thereon. The fluorocarbon polymer can then be fixed in the pure state on the keying layer.

Other fixing processes have been described wherein various chemical keying adjuvants are added to a dispersion of the fluorocarbon resin, such dispersions being well known in the art. Such processes are disclosed more particularly in French Pats. 1,020,903, 1,536,986, 1,537,129, 1,386,898, 2,024,171.

The coatings prepared by these various processes have the following disadvantage in common: their resistance to abrasion is just sufficient to satisfy the conditions of use assoicated with cooking utensils.

To obviate these disadvantages, it has been proposed to make composite coatings wherein an added porous layer or "hard base" is deposited on the utensil metal before being covered with the fluorocarbon resin. In practice, these hard bases are obtained by depositing metals, alloys or oxides of these metals on the metal surface, e.g. aluminium, or alternatively cermets. Such intermediate layers are deposited in practice by spraying the said substances by means of a plasma or flame gun.

These various processes are very expensive. Also, keying the fluorocarbon resin on the hard layer is not always easy, and it is also often difficult to produce a coating having the suitable degree of porosity together with suitable hardness.

Another process is described in French Pat. 1,536,889 wherein a single layer of vitreous balls of a diameter of about 10 to 500 microns is deposited on the metal surface to give approximately 15 balls per square centimetre. These balls are fixed by a binder which covers them and the binder is in turn covered by an aqueous dispersion of particles of the fluorocarbon resin.

The process, however, is complicated to perform, because it is difficult to ensure regular distribution of the balls on the metal surface. Also, the process is complex. In some countries, including France, the use of chromic acid and chromates for the production of kitchen articles is prohibited because of the risks of these products to public health.

The object of this invention is to obviate the disadvantages of the various processes set out above. It has as its object more particularly to produce cheap kitchen utensils having abrasion-resistance equal to these comprising a suitable hard base and without the use of any toxic or prohibited product.

The present invention is based on the following unexpected finding. If, instead of producing a hard intermediate layer, the actual mixture of fluorocarbon resin and sintered glaze is hardened, the resulting coating has outstanding abrasion-resistance and requires no chromic acid for its fixing on the metal base.

According to the invention, the non-stick coating composition, more particularly for coating metal surfaces, such as aluminium discs, comprising an aqueous dispersion of fluorocarbon resin particles and a non-ionic wetting agent is characterized in that said composition contains also an aqueous slip comprising sintered glaze particles dispersed in water, said particles having a melting point above 400° C.

Experiment has given the surprising result that the said association of fluorocarbon resin particles and sintered glaze particles gives an intrinsically hard fluorocarbon coating having excellent abrasion-resistance while retaining sufficient non-stick quality in operation.

Preferably, the sintered glaze particles used have a melting temperature of between 500 and 600° C.

The sintered substance of such a slip must, inter alia, be free from lead and more generally any chemical compound whose melting point is below 400° C., for reasons which will be explained hereinafter.

According to one advantageous embodiment, the percentages of the fluorocarbon resin particles and of the sintered glaze particles, in the anhydrous state are substantially as follows:

fluorocarbon resin particles: between 50% and 30% by weight of the composition,
sintered glaze particles: between 10% and 30% by weight of the composition.

From the above-indicated numerical data, a specific non-stick coating composition can be obtained from an aqueous suspension containing a total of 60% of anhydrous products and 40% water.

According to another important feature of the invention, the sintered glaze particles are advantageously angular whereby the fluorocarbon resin can be keyed on said particles so that the latter cannot be shifted under the effect of the pressure exerted, for example, by a spatula, since that would destroy the cohesion of the coating. An effect of this kind is found in the case of the use of balls according to the prior-art process indicated hereinbefore.

To reinforce this cohesion, the sintered glass particles are preferably selected—according to another feature of this invention—so that the particles of the glaze have a size of the order of that of the particles of fluorocarbon resin and between 3 and 20 microns, and on average 8 microns.

A preferred but non-limitative embodiment of this invention comprises selecting a total coating thickness of between 30 and 60 microns, preferably between 30 and 35 microns, to allow a statistical distribution of the particles of sintered glaze comprising, in the direction of the thickness, on average three sintered glaze particles completely enclosed in fluorocarbon resin. A thickness of this kind also provides better cooking heat transmission through the coating.

Experiment has shown that the maximum thickness of the total coating which can be expected without the danger of cracking of the coating after sintering of the polymerised fluorocarbon is 60 microns. If it is required to produce coatings of a thickness of above 60 microns, a number of successive applications are required, the products being placed in the kiln between the first and second applications, and so on between two subsequent successive applications, each passage through the kiln ensuring sintering of the last-deposited layer. However, excessive thickness has an adverse effect on the proper transmission of the heat through the non-stick coating to the food being cooked.

According to another feature of the invention, grinding and hardening adjuvants, such as potassium and sodium silicate, caustic potash, and boric acid, are added to the sintered glaze aqueous suspension which in the French glaze industry is at present known as a sintered glaze slip.

These adjuvants set as suspension agents for the ground sintered substances, the viscosity of which can thus be adjusted before being placed in the kiln. More particularly, boric acid and potash serve to facilitate the wetting of aluminium by the slip and adjust the pH of the latter to a value of between 10 and 11 in the case of the slips used for coating aluminium.

The pH is thus very close to that of the fluorocarbon resin aqueous dispersion containing a non-ionic wetting agent such as isooctyl phenoxy polyepoxy ethanol, which is intended for mixing with the slip, and which pH has a value of between 9.5 and 11.

This allows very easy mixing of the slip and of the fluorocarbon resin dispersion.

The preferred fluorocarbon resin most usually employed within the scope of the invention is polytetrafluoroethylene (PTFE), but it may be also selected from the fluorine copolymers such as polyfluoroethylene propylene and polyethylenetetrafluoroethylene.

The coating provided by the invention may also be coloured by pigments, either by grinding the pigments with the slip to give the particles of the latter the required fineness, or by incorporating them in the mixture formed from the slip and the fluorocarbon resin, or by mixing the pigments with the dispersion of fluorocarbon resin.

For industrial application, the non-stick coating composition to which the invention relates is spread on the entire surface for coating of metal sheets, discs or plates, at least over one of the surfaces thereof, so as to form a continuous coating, the thickness of which is preferably between 30 and 60 microns as indicated hereinbefore. The coating may be spread by any suitable means, for example a brush, sponge, or a pneumatic spray gun (of the Airless type).

The composition is then subjected to drying at 70–90° C. by hot air or by infra-red radiation, or by any other means compatible with maintaining good cohesion between its constituent elements. The drying time is calculated so as to ensure complete evaporation of the water contained in the aqueous suspension. At the end of this drying operation the composition is then sintered in the kiln at a temperature of about 400° C. for a period of from 10 to 15 minutes.

It will be apparent that in view of the specific characteristics of the angular shape and grain size in accordance with which the sintered glaze particles are selected, the sintered glaze must be free from lead and more generally from any chemical compound with a melting point below 400° C., in order to prevent such metals from melting during sintering in the kiln at the exact temperature of 400° C., and entraining with them the sintered glaze particles by gravity towards the bottom points of the coating composition, since this would destroy the regular statistical distribution of the particles in stratified layers within the polymerised fluorocarbon.

The coating provided by the invention has outstanding hardness, compactness and abrasion-resistance, while having a non-stick surface for food, thus preventing them from sticking to the kitchen utensil and offering advantages comparable with those of pure PTFE coatings.

By using the above-described production process it is possible to produce any manufactured articles, more particularly cooking utensils, formed by known drawing or pressing operations or by any other means from sheets, discs or plates coated with the composition in question. The resulting manufactured articles are distinguished in that they comprise a non-stick but intrinsically hard polymerised fluorocarbon coating.

Three advantageous examples of preparing a sintered glaze slip will now be given without limiting force.

EXAMPLE 1

A slip was prepared having the following composition:

|  | G. |
|---|---|
| $Na_2O$, 22.2%; $K_2O$, 7.2%; $SiO_2$, 32.1%; $Al_2O_3$, 7.7%; $B_2O_3$, 19.9%; $Sb_2O_3$, 5.8%; NaF, 2.3%; $AlF_3$, 1.6%; and $CaF_2$, 1.2% | 1,000 |
| Sodium silicate liquid (density=1.33) 1 part } Potassium silicate liquid (density=1.33) 3 part } | 10 |
| Caustic potash | 10 |
| Boric acid | 40 |
| Water | 350 |

The mixture is ground, for example, in a high-density porcelain ball mill to a fineness of 0.1 on a Bayer 16,900 mesh per square inch frusto-conical screen.

When this fineness has been obtained, the slip is mixed with the aqueous PTFE dispersion in the following proportion:

|  | Parts by weight |
|---|---|
| Aqueous PTFE dispersion containing 60% by weight of PTFE particles having a size between 0.1 and 0.5 microns and 6% by weight of isooctyl phenoxy polyepoxy ethanol as non-ionic wettting agent | 100 |
| Slip of sintered glaze particles | 15 |

This composition is applied by spray gun or any other means to an aluminium disc which has previously been roughened by sand-blasting but preferably by chemical attack with hydrochloric acid. It is then dried at about 80–90° C. to evaporate the liquid phase, and then sintered in a kiln at 400° C.

EXAMPLE 2

A slip was prepared having the following composition:

|  | G. |
|---|---|
| $Na_2O$, 20.3%; $K_2O$, 5.0%; $Li_2O$, 3.0%; $SiO_2$, 21.9%; $Al_2O_3$, 5.4%; $B_2O_3$, 24.0%; $Sb_2O3$, 5%; $CaF_2$, 1%; ZnO, 6%; and LiF, 8.4% | 1,000 |
| Sodium silicate liquid (density=1.33) 1 part } Potassium silicate liquid (density=1.33) 3 parts } | 10 |
| Caustic potash | 10 |
| Boric acid | 40 |
| Water | 300 |

Grinding and the sequence of operations are identical to the description in Example 1.

The percentage of slip used in the coating composition may vary between 5 and 50% by weight depending upon the degree of hardness or the final non-stick property required of the coating.

The coating may be coloured by pigments as indicated hereinbefore.

With regard to the sintered products, good results are obtained with compositions satisfying, for example, the following formula:

|  | Percent |
|---|---|
| $SiO_2$ | 30–45 |
| $B_2O_3$ | 0–10 |
| $LiO_2+Na_2O+K_2O$ | 25–35 |
| $TiO_2$ | 15–30 |
| $Al_2O_3$ | 0–10 |

Other oxides may also be incorporated in the composition in a proportion of from 0 to 10%, i.e.

$ZrO_2$, $SnO_2$, $ZnO$, $CaO$, $P_2O_5$.

Such compositions of sintered glaze or enamel are sold by Bayer under the trademarks AL 6110 and 6100 and by Ferro under the trademarks AL 8 and CN 500.

More particularly, experiment has shown that any one of the three sintered glaze formulae indicated in the following Table is also suitable for the production of a coating composition according to the invention.

| Formulae | Percent | | |
|---|---|---|---|
| | No. 1 | No. 2 | No. 3 |
| $Na_2O$ | 16.8 | 17.8 | 24.8 |
| $K_2O$ | 3.7 | 3.9 | 3.7 |
| $SiO_2$ | 21.0 | 22.3 | 21.3 |
| $Al_2O_3$ | 5.9 | | 1.0 |
| $B_2O_3$ | 33.66 | 35.6 | 19.6 |
| $Sb_2O_3$ | 4.8 | 5.1 | 4.9 |
| $NaF$ | 8.0 | 8.6 | 11.0 |
| $AlF_3$ | 5.4 | 5.7 | 7.0 |
| $CaF_2$ | 0.8 | 1.0 | 1.5 |
| $ZnO$ | | | 4.0 |

In these formulae, the sodium and potassium silicates act as grinding adjuvants for the sintered glaze. They may also be replaced by metasilicates of the same metals. In either case, they form suspension agents for the ground sintered glaze and contribute to adjustment of the viscosity of the mixture and to the hardening of the coating before being placed in the kiln.

As indicated, the present invention relates not only to the non-stick coating composition and its application to a non-stick coating production process, but also to a fluorocarbon resin non-stick coating for cooking utensil, containing sintered glaze angular particles statistically distributed and enclosed in the fluorocarbon resin coating, these particles having preferably a size between 3 and 20 microns and on average 8 microns.

What we claim is:

1. A non-stick coating composition for coating metal surfaces consisting essentially of an aqueous dispersion of fluorocarbon resin particles, a non-ionic wetting agent and an aqueous slip consisting of sintered glaze particles having a melting point substantially between 500 and 600° C., the percentages of the fluorocarbon resin particles and of the sintered glaze particles being substantially as follows:

fluorocarbon resin particles: between 30% and 50% by weight of the composition;

sintered glaze particles: between 10% and 30% by weight of the composition.

2. A composition according to claim 1, wherein the sintered glaze particles are angular.

3. A composition according to claim 1, wherein the particles of the sintered glaze slip have a size of between 3 and 20 microns, and on average 8 microns.

4. A composition according to claim 1, wherein the sintered glaze slip also contains grinding and hardening adjuvants selected from the group consisting of sodium and potassium silicates, caustic potash and boric acid.

5. A composition according to claim 1, wherein the fluorocarbon resin is polytetrafluoroethylene.

6. A composition according to claim 1, wherein the fluorocarbon resin is selected from the fluorine copolymers consisting of polyfluoroethylene-propylene and polyethylene-tetrafluoroethylene.

7. A composition according to claim 4, having a pH substantially between 10 and 11.

8. A composition according to claim 1, wherein the sintered glaze particles are formed of the mixture of the following compounds:

| | Percent by weight of the mixture |
|---|---|
| $SiO_2$ | 30–45 |
| $B_2O_3$ | 0–10 |
| $LiO_2+Na_2O+K_2O$ | 25–35 |
| $TiO_2$ | 15–30 |
| $Al_2O_3$ | 0–10 |
| $ZrO_2$ | 0–10 |
| $SnO_2$ | 0–10 |
| $ZnO$ | 0–10 |
| $CaO$ | 0–10 |
| $P_2O_5$ | 0–10 |

References Cited

UNITED STATES PATENTS 3,489,595   1/1970   Brown _____ 260—29.6 F
3,709,721   1/1973   King _____ 260—29.6 F HAROLD D. ANDERSON, Primary Examiner U.S. Cl. X.R.

117—161 UZ; 260—42.27

UNITED STATES PATENT OFFICE
CERTIFICATE OF CORRECTION

Patent No. 3,850,867     Dated November 26, 1974

Inventor(s) Louis Hartmann

It is certified that error appears in the above-identified patent and that said Letters Patent are hereby corrected as shown below:

Column 1, in the heading, line 7, after "Ser. No. 343,146" the following should be added:

-- Claims priority, application France, Apr. 11, 1972, 72 12608 --.

Signed and sealed this 15th day of April 1975.

(SEAL)
Attest:

RUTH C. MASON
Attesting Officer

C. MARSHALL DANN
Commissioner of Patents
and Trademarks